April 29, 1941.  E. M. SPLAINE  2,239,746
OPHTHALMIC MOUNTING
Filed March 24, 1939
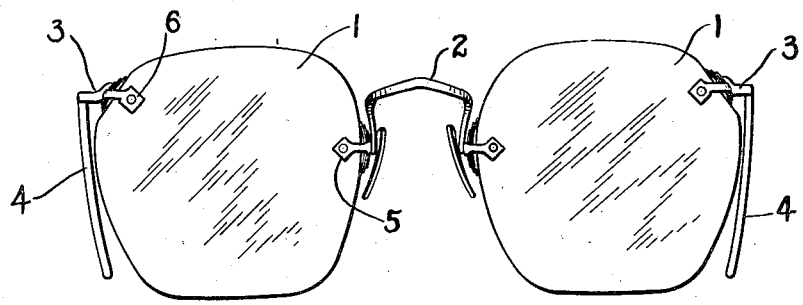
Fig. I
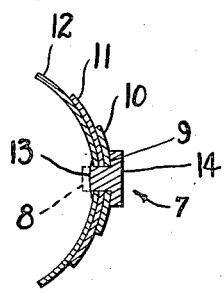 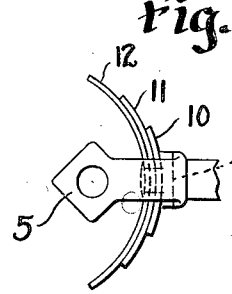 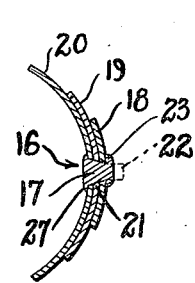 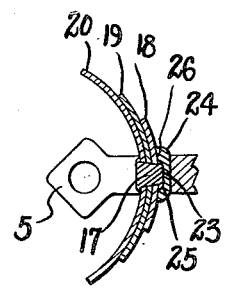
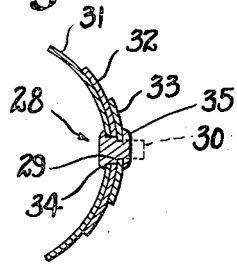 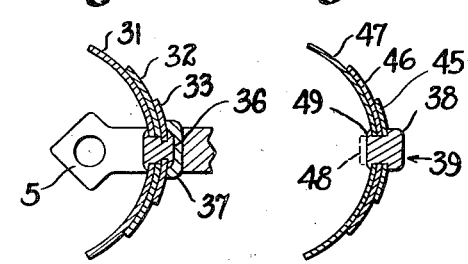 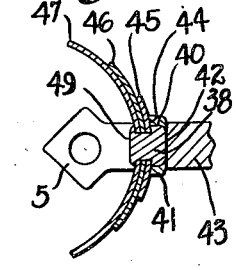
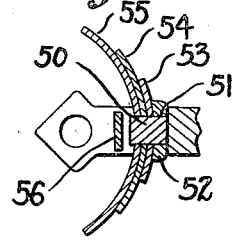 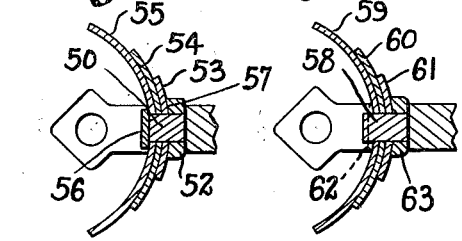 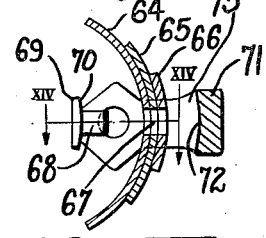
 
INVENTOR.
Edward M. Splaine
BY Harry H. Stjell
ATTORNEY.

Patented Apr. 29, 1941

2,239,746

UNITED STATES PATENT OFFICE 2,239,746

OPHTHALMIC MOUNTING

Edward M. Splaine, Southbridge, Mass., assignor to American Optical Company, Southbridge, Mass., a voluntary association of Massachusetts Application March 24, 1938, Serial No. 197,838

7 Claims. (Cl. 88—47)

This invention relates to improvements in ophthalmic mountings and has particular reference to improved lens holding means.

One of the principal objects of the invention is to provide an improved lens holding means that will resiliently ease off the rigidity of the connection of the lens holding means to the lens, that will insure the lens holding means returning to its initial aligned position after such easing off, that will maintain the connection of the lens holding means to the lens firm and substantially rigid to prevent looseness and play during the use of the mounting and will be of such a nature as to relieve shock and strain on the lenses when the glasses are dropped or roughly handled, and which is so constructed as to permit the parts to be quickly and accurately assembled.

Another object of the invention is to provide lens holding means with a plurality of resilient sections which are held on said lens holding means by integrally connected securing means.

Another object of the invention is to provide lens holding means with a curved attaching seat on which a plurality of resilient means are integrally connected by a welded connection member.

Another object is to provide lens holding means of the above character with resilient means cupped to a desired radius of curvature and with means for supporting said resilient means forming a curved backing support for said resilient means adjacent the point of attachment thereof to the lens holding means.

Another object is to provide novel means of making lens holding means of the above character wherein the operation of joining the resilient means to the lens holding means by welding or soldering will not affect the tension of or distort the resilient means.

Another object is to provide novel means of forming lens holding means of the above character wherein the parts may be quickly and easily positioned in aligned assembled relation and be permanently secured to the lens holding means in said relation.

Other objects and advantages of the invention will become apparent from the following description taken in connection with the accompanying drawing, and it will be understood that many changes may be made in the arrangement of parts and details of construction shown and described without departing from the spirit of the invention as set forth in the accompanying claims. I, therefore, do not wish to be limited to the exact arrangement of parts and details of construction shown and described, as the preferred forms only have been given by way of illustration.

Referring to the drawing:

Fig. I is a front elevation of an ophthalmic mounting embodying the invention;

Fig. II is an enlarged longitudinal sectional view of a resilient unit in connected relation with the means for securing the said unit to the lens strap;

Fig. III is a side elevation of the construction illustrated in Fig. II in assembled relation with the lens strap;

Fig. IV is a view generally similar to Fig. II illustrating a modified form of the invention;

Fig. V is a view similar to Fig. IV, showing the device of Fig. IV in secured relation with the lens strap;

Fig. VI is a view similar to Fig. IV showing a further modified form of the invention;

Fig. VII is a view similar to Fig. V showing the device of Fig. VI in secured relation with the lens strap;

Fig. VIII is a view generally similar to Fig. VI, showing a further modification of the invention;

Fig. IX shows the device of Fig. VIII in secured relation with a lens strap;

Fig. X is a view generally similar to Fig. IX illustrating a further modification of the invention;

Fig. XI shows the parts of the device of Fig. X in secured relation with each other;

Fig. XII is a view similar to Fig. XI, illustrating a further modification of the invention;

Fig. XIII is a view generally similar to Fig. XII, illustrating a further modification and showing the parts in disunited relation;

Fig. XIV is a sectional view of Fig. XIII, showing the connecting means and resilient means in assembled relation; and Fig. XV shows the device of Figs. XIII and XIV in assembled relation with the lens strap.

Lens straps having resilient means for engaging the edge of the lens to relieve shock and strain are not new in the art, but due to differences in the materials used in forming the resilient means and lens straps, in order to obtain the desired resilient function of said resilient means on one hand, and the desired precious metal, non-corrosible, easy, workable material for the lens straps on the other hand, it has introduced some difficulty in providing suitable means for attaching the resilient means to the lens strap. Several different arrangements and methods have been tried, and experimental development work continually conducted with the hope of obtaining a simple, durable and efficient arrangement and method of securing the resilient means to the lens strap wherein the parts may be quickly and easily assembled and more positively maintained in desired fitting aligned relation with each other during use.

The present invention, therefore, is directed to improved means and method of quickly, easily, and more positively securing the resilient means to the lens strap wherein a rigid and durable construction is obtained.

Referring more particularly to the drawing wherein like characters of reference designate like parts throughout the several views, the device embodying the invention comprises broadly a pair of lenses 1 connected by a bridge member 2 and having end pieces 3 to which suitable temples 4 are pivotally attached. The bridge member 2 and end pieces 3 are secured to the lenses by the lens straps 5 and 6 embodying the invention.

The lens straps or lens holding means 5 are attached to the lenses at a position known in the art as "on center" and the lens straps or lens holding means 6 are secured to the lenses at a high position or at a position known in the art as "above the useful field of side vision."

The invention applies to either one or the other of said lens straps, although only the "on center" type strap and resilient means have been shown.

The arrangement shown in Figs. II and III embodies a headed pin member 7 having a reduced extension 8 which is practically rectangular in cross sectional shape but which may be formed square, oval, or to any other shape desired which is practical for use. The pin is also provided with a curved seat 9 against which the plurality of resilient sections 10, 11 and 12 are positioned. Each of the sections 10, 11 and 12 are provided with openings shaped to fit and receive the reduced extension 8 which is thereafter headed over, as illustrated at 13, to secure the resilient sections in aligned superimposed relation with each other against the curved seat 9 of the pin. The head is provided with a surface 14 which is shaped to fit the inner surface 15 of the portion of the lens strap which overlies the edge of the lens. The surface 14 is secured to the surface 15 by soldering or welding. The said surfaces may be intimately related with each other by applying pressure to the parts prior to the soldering or welding operation.

The advantage of the above construction is that of providing ease and accuracy in assembling the plurality of resilient members with the headed pin wherein the curvature of said resilient sections will be maintained during the securing of the said sections to the pin. The pin and plurality of attached resilient sections are then handled as a unit which is pressed in proper aligned relation with the lens strap and secured thereto by soldering or welding.

Figs. IV and V illustrate a slightly modified construction wherein the headed pin member 16 is provided with a tapered body portion 17 fitting within openings in the respective resilient sections 18, 19 and 20, having similar tapered side walls 21. The body portion 17 is provided with a reduced extension 22, which is headed over as illustrated at 23, to secure the said resilient sections to the headed pin member. The assembled unit is then attached to the portion of the lens strap 24 which is to overlie the edge of the lens, by securing the headed over portion 23 to a similarly shaped seat 25 on the portion 24 by soldering or welding. The seat 25 may be formed by pressing the portion 23 into the material of the portion 24 an amount sufficiently to cause the resilient section 18 to move into fitted relation with the curved supporting face 26 of the portion 24, or by milling a recess of the shape of the seat 25 in the face 26.

In instances wherein the headed pin member 16 is welded to the portion 24, it is preferably desirable that the entire surface area of the portion 23 be in substantial intimate relation with area of the seat 25, as this will provide a widely welded joining area. This is brought about by applying a pressure on the pin member 16 sufficiently to move the contour of the portion 23 into intimately related position with the seat 25. The welding operation is then completed by suitable means known in the art.

The pin 16 is provided with a tapered body portion 17, primarily for the purpose of ease of assembly of the resilient sections and to distribute the pressure strain introduced in heading over the end 22 throughout the length of said body portion. This obviates the necessity of the head 27 to take up all of said strain.

Figs. VI and VII illustrate a further modification wherein the headed pin member 28 is provided with a shouldered portion 29 and reduced extension 30. The shouldered portion 29 is adapted to receive the resilient sections 31 and 32, and the reduced extension 30 is adapted to receive the resilient section 33, that is, the respective portions of the pin member 28 and openings of the resilient sections are so sized as to suitably fit with each other. The length of the shouldered portion 29 is such that it normally extends substantially entirely through the aligned openings of the resilient sections 31 and 32. The resilient section 33, fitted on the reduced extension 30, is adapted to engage the shouldered portion 29 and function in cooperation with the head 34 to distribute the strain of heading over the reduced extension 30, as illustrated at 35, throughout the different supporting portions of said resilient sections. The assembled unit is then soldered or welded, as illustrated at 36, to the portion 37 of the lens strap 5, which is to overlie the edge of the lens.

In Figs. VIII and IX, there is shown a further modification wherein the pre-formed head 38 of the pin member 39 is fitted into an opening 40 in the portion 41 of the lens strap which is to overlie the edge of the lens, and is secured, as illustrated at 42, to an adjacent portion 43 of the bridge 2 or end pieces 3 which are secured to said lens strap. This securing may be either by soldering or welding. It is to be noted that the side walls of the portion 38 will likewise be simultaneously soldered or secured to the walls 40. It is to be noted that the surface of the pre-formed head 38, on which the resilient sections 45, 46, and 47 are supported, is slightly curved and is adapted to assume a flush relation with a similarly curved surface 44 on the portion 41. These flushed curved surfaces provide a backing support for the various resilient sections.

It is to be noted, as illustrated at 49, that the reduced end 48 of the pin member 39 may be headed over to secure the various resilient sections to the pin member 39 either before or after the said pin member is secured in position on the lens strap. In the latter instance, the head 38 of the pin member 39 would be secured in position in the opening 40 by soldering or welding. The various resilient sections 45, 46 and 47 would then be placed on the reduced extension 48 and secured in position thereon by heading over the said pin member as illustrated at 49.

This latter procedure may also be followed out with the construction illustrated in Figs. II and III.

Figs. X and XI illustrate a further modification wherein a pin member 50 of suitable length is secured within an opening 51, in a portion of the lens strap 52 which is to overlie a portion of the lens, by soldering or welding. The various resilient sections 53, 54 and 55 are then placed on the pin member 50 and a separate disc or the like 56 is secured to the end of the pin member 50 by soldering or welding as illustrated in Fig. XI.

The disc 56 is of such a size as to overlie the adjacent resilient section 55 and function as an integral head on the pin member 50 for holding the said sections in desired assembled relation with the lens strap. It is to be noted that the inner face 57 of the portion 52 is cupped substantially to the same radius of curvature as the cupping of the resilient means.

The securing of the disc 56 to the pin member 50 may be a joined hot rivet and welding operation, in which instance the material of the pin 50 would be distributed sufficiently to compensate for differences in the dimensional characteristics between the sizes of the openings and the size of the body portion of the pin member and the disc 56 will be simultaneously forced into compressing engagement with the various resilient sections and integrally joined with the end of the pin member 50 in this relation.

Fig. XII illustrates a construction generally similar to Fig. XI, in which instance heat of sufficient intensity to soften the pin member 58 is applied thereto after the various resilient sections 59, 60 and 61 have been placed on said pin member, to form a head 62 overlying and securing the resilient sections to the edge portion 63 of the lens strap.

In the construction illustrated in Figs. XI and XII, the respective pin members are secured within the openings in the portions which are to overlie the edge of the lens, by hard soldering or welding.

Figs. XIII to XV inclusive, illustrate a further modification wherein the plurality of resilient sections 64, 65 and 66 are provided with aligned openings 67. The pin member 68 in this instance is provided with an enlarged head 69 having an inner surface 70, which is curved in the direction of the longitudinal axes of the resilient sections. The said face 70, as illustrated in Figs. XIV and XV, in the opposite direction, is substantially flat. The pin 68 and the openings 67 are correspondingly sized so that the pin will have a fairly snug fit with the openings 67 in the portions 64 and 65 and a more intimate fit with the opening in the portion 66. This causes the resilient section 66 to hold the remainder of the resilient sections in position on the pin member, as shown in Fig. XIV, so that the said pin and resilient sections may be handled as a separate unit. The portion of the lens strap 71, which is to overlie the edge of the lens, is provided with a seat 72 which is shaped to correspond with the end shape of the pin so as to require only a slight pressure fit of the end of the pin member 68 on said seat. Sufficient pressure is applied to force the contiguous surfaces of the resilient sections 64, 65 and 66 into fairly intimate relation with each other and the said pin member is then soldered or welded on said seat. Suitable electrodes, such as shown at 73 and 74, may be used if desired. The electrodes 73 are in the form of suitable clamp jaws which grip the arms 75 of the lens strap. The electrode 74 may be in the form of a pressure plunger connected with a suitable source of electricity whereby a hot shot of electrical current may be applied to the pin 68, and the temperature thereof may be so controlled as to cause the major portion of the welding to take place adjacent the end of the pin 68 which is positioned on the seat 72 and to simultaneously cause the pin member 68 to intimately engage the adjacent contacting surfaces of the various spring sections.

It is to be particularly noted that the supporting face 72 of the portion 71 is cupped substantially to the same radius of curvature as the cupping of the various resilient sections and that the surface 70 is likewise similarly cupped. This cupping is preferably only in the direction of the longitudinal axes of the resilient means.

In all of the above constructions it is to be understood that the various pin members may be formed to any desirable cross sectional shapes, such as rectangular, oval, square, oblong, etc., and that the openings in the various resilient sections will be similarly shaped to the corresponding pin members.

From the foregoing description it will be seen that simple, efficient and economical means and method have been provided whereby the resilient means may be quickly and easily assembled with the lens holding means so as to retain a desired relation with said lens holding means, and more particularly a method of attaching the resilient supporting means to the lens holding means through the application of a head whereby the parts may be soldered or welded together without drawing the temper or otherwise altering the resiliency and function of the resilient means.

Having described my invention, I claim:

1. In a device of the character described for use with lens holding means having a portion shaped to overlie a face of the lens and a portion shaped to overlie an edge of the lens, a plurality of resilient sections having openings therein which may be aligned, and a pin member in said openings, means interrelating said resilient sections with said pin member so as to provide an assembly that may be handled as a single unit and that may be positioned in desired relation with the portion of the lens holding means which is to overlie the edge of the lens and be held in said relation by heat joining said pin member to said portion.

2. In a device of the character described for use with lens holding means having a portion shaped to overlie a face of the lens and a portion shaped to overlie an edge of the lens, a pin member comprising a body portion having an enlarged head adjacent one end thereof and a plurality of resilient sections each having an opening intermediate the ends thereof, with the opening in one of said resilient sections slightly smaller than the cross-sectional dimension of the body portion of the pin member, said resilient sections being in stacked relation with each other on said pin member with the said resilient section having the opening therein slightly smaller than the cross-sectional dimension of said body portion pressed on to said body portion and functioning as holding means for retaining the said resilient sections in desired assembled relation on said pin member so as to provide an assembly that may be handled as a single unit and be secured to the portion of the lens holding means which is to overlie an edge of the lens by securing the end of the pin member opposite the enlarged head to said portion.

3. In a device of the character described for use with lens holding means having a portion shaped to overlie a face of the lens and a portion shaped to overlie an edge of the lens, and having an opening therein, a pin member comprising a body portion having an enlarged head adjacent one end thereof and a plurality of resilient sections each having an opening intermediate the ends thereof with the opening in one of said resilient sections slightly smaller than the cross-sectional dimension of the body portion of the pin member, said resilient sections being in stacked relation with each other on said pin member with the said resilient section having the opening therein slightly smaller than the cross-sectional dimension of said body portion pressed on to said body portion and functioning as holding means for retaining the said resilient sections in desired, assembled relation on said pin member so as to provide an assembly that may be handled as a single unit and be secured to said portion of the lens holding means which is to overlie the edge of the lens by placing the end of the pin member opposite the enlarged head internally of the opening in said portion overlying the edge of the lens and by heat joining said end in said opening.

4. In a device of the character described for use with lens holding means having a portion shaped to overlie a face of and a portion shaped to overlie an edge of a lens, a plurality of resilient sections having portions thereof which may be aligned, aligning means on each of said sections adjacent said alignable portions and means interrelating and holding said resilient sections together in said alignment so as to provide an assembly that may be handled as a single unit and that may be positioned in desired relation with the portion of the lens holding means which is to overlie the edge of the lens and be held in said relation by heat joining said assembly with said portion.

5. A device of the character described comprising lens holding means secured to a lens with a portion thereof overlying an edge of the lens and a portion overlying a face of the lens and pivotally secured to said lens, a plurality of resilient sections having aligned openings therein and a pin member in said openings, means interrelating said resilient sections with said pin member and providing an assembly that may be handled as a single unit so that it may be initially positioned in desired relation with the portion of the lens holding means overlying the edge of the lens, and said pin member being heat joined to said portion overlying the edge of the lens to secure said assembly to said lens holding means, with the said resilient sections lying between the edge of the lens and the portion of the lens holding means overlying said edge.

6. A device of the character described comprising lens holding means having a portion shaped to overlie a face of the lens and a portion shaped to overlie an edge of the lens, a plurality of resilient sections having openings therein, a pin member having a body portion extending through said openings when aligned and having enlarged head portions adjacent the opposite ends thereof for holding the resilient sections in desired stacked relation with each other, with said pin functioning to retain said resilient members in desired assembled relation with each other so that they may be initially handled as a single unit, and one of the enlarged heads of said pin being secured to said portion shaped to overlie the edge of the lens for securing said resilient sections and pin member to said portion.

7. A device of the character described comprising a lens, lens holding means having a portion shaped to overlie a face of the lens and pivotally secured to said lens and a portion shaped to overlie the edge of the lens and having a plurality of resilient members secured thereto by a pin, said resilient members having aligned openings therein and said pin having a body portion extending through said aligned openings and having enlarged heads at its opposite ends overlying the opposed sides of said resilient members and securing said resilient members together so that they may be initially handled as a single unit, and the said pin having one of its enlarged heads secured to said portion overlying the edge of the lens to secure said resilient members in desired assembled relation with said portion.

EDWARD M. SPLAINE.